2 Sheets--Sheet 1.
A. K. RIDER.
Hot-Air Engines.
No. 5,340. Reissued March 25, 1873.
Fig. 2.
Fig. 1.
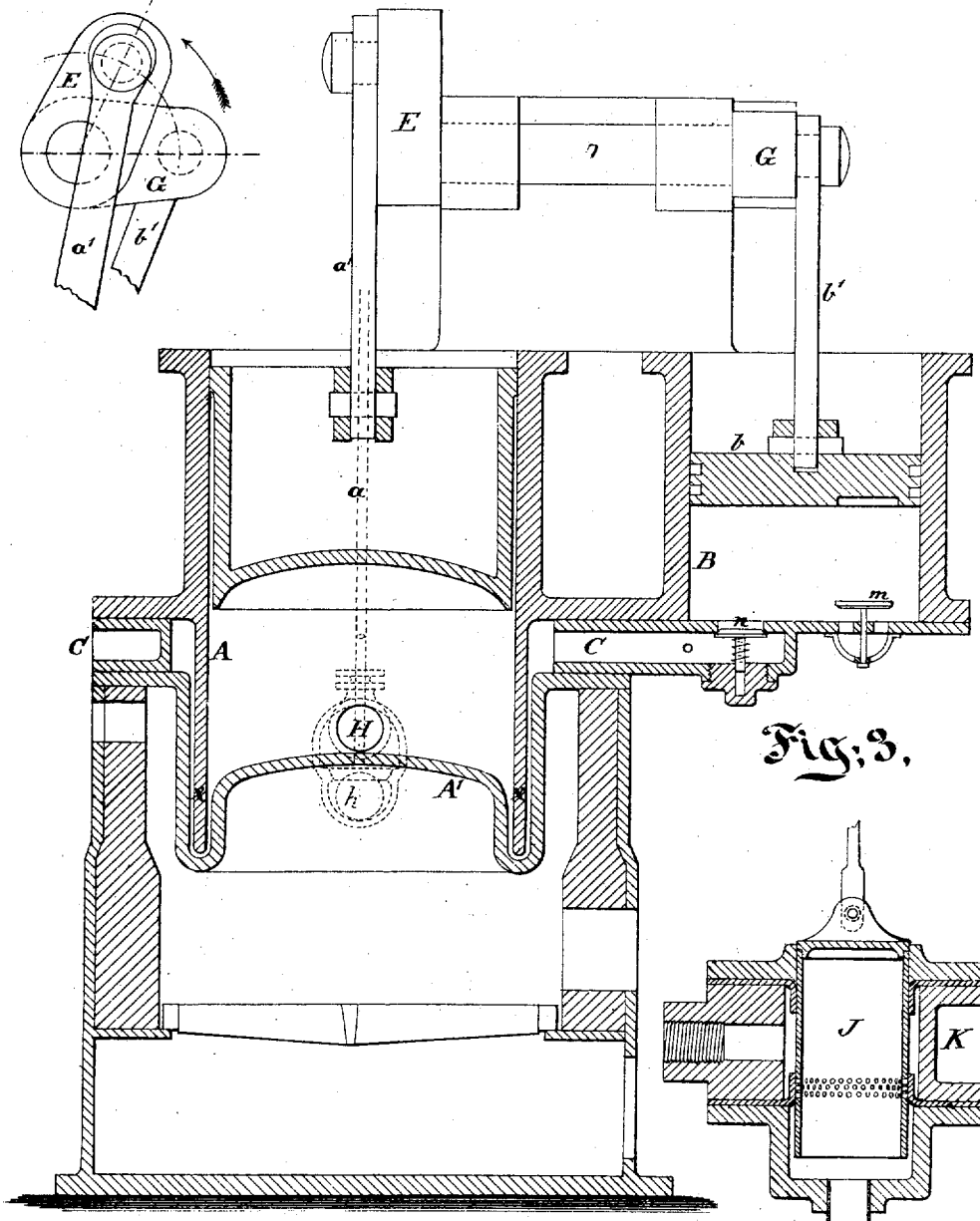
Fig. 3.
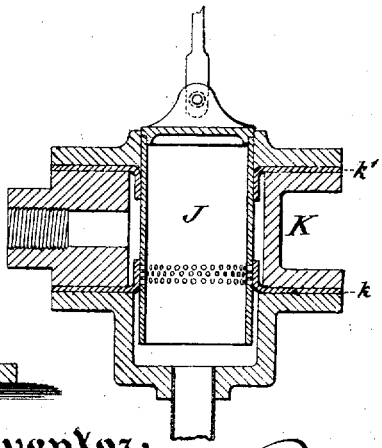
Witnesses:
Arnold Hörmann.
Alf. C. Westbrook
Inventor:
Alexander K. Rider
by his attorney F. L. Slocum
New York 2 Sheets--Sheet 2.
A. K. RIDER.
Hot-Air Engines.
No. 5,340. Reissued March 25, 1873.
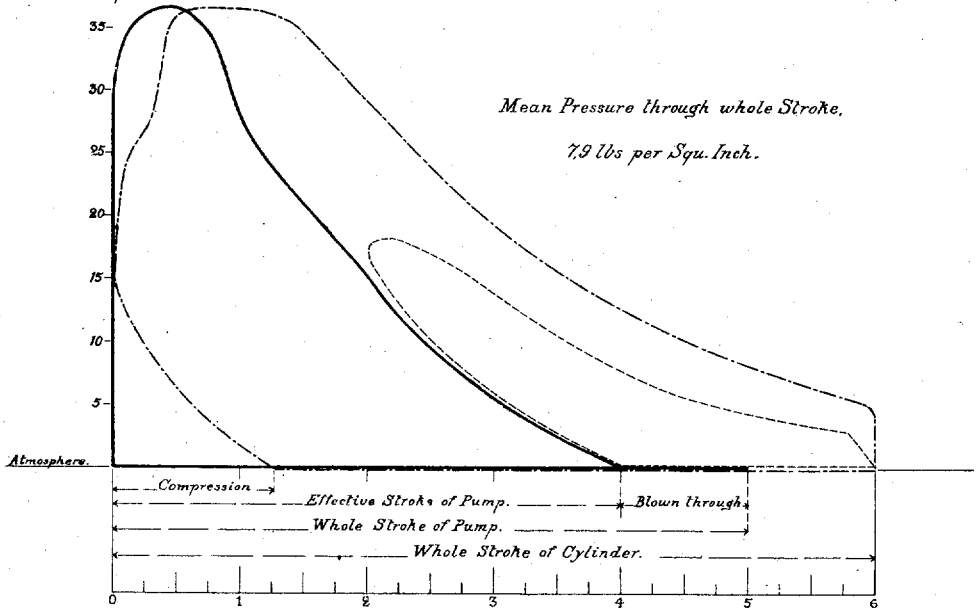
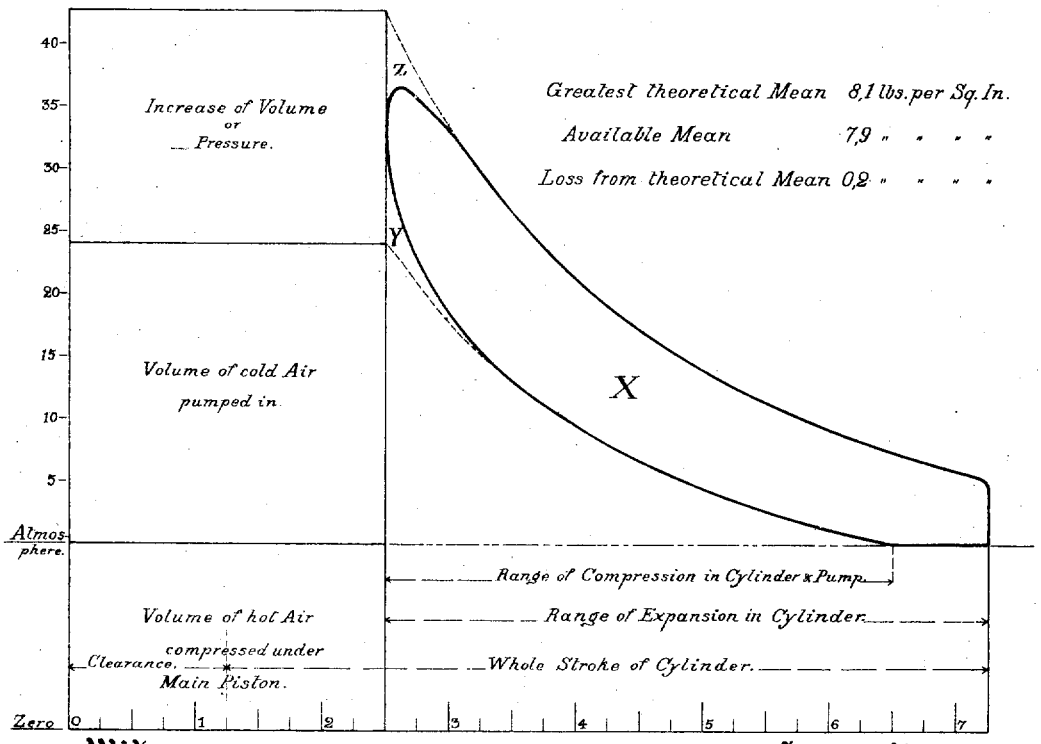
Witnesses:
Arnold Hermann.
Alf. C. Weisbrook
Inventor:
A. K. Rider
by his attorney F. L. Stetson

UNITED STATES PATENT OFFICE.

ALEXANDER K. RIDER, OF NEW YORK, N. Y.

IMPROVEMENT IN HOT-AIR ENGINES.

Specification forming part of Letters Patent No. 128,979, dated July 16, 1872; reissue No. 5,340, dated March 25, 1873.

*To all whom it may concern:*

Be it known that I, ALEXANDER K. RIDER, of New York city, in the State of New York, have invented an Improvement in Hot-Air Engines, of which the following is a specification:

My improvement relates to that class of hot-air engines in which air is compressed in one cylinder, designated a supply-cylinder, and usefully expanded in another, called the working-cylinder, being heated in the interior so as to increase its force or effect. It being understood that the packing and other features not described are of any ordinary or suitable character, I will call attention to the features which involve novelty.

The accompanying drawing forms a part of this specification.

Figure 1 is a central vertical section of so much of a complete engine as is required to show the novelty and to indicate the relation of the novel parts to the other parts. Fig. 2 is a view of a small portion at right angles to the view in Fig. 1; and Fig. 3 is a section, showing a detail on a large scale.

Similar letters of reference denote corresponding parts in all the figures.

Denoting the working-cylinder by A, the bottom—usually termed the heater—by A′, and the supply-cylinder by B, I introduce an intermediate casting or waist-piece, marked C, which performs the several functions of firmly connecting the parts, conveying the air from the supply-cylinder to the working-cylinder, distributing it uniformly around to enter the narrow space provided for its admission into the bottom of the heater, and thus into the space below the working-piston, and serving to cut off or arrest the conduction of heat upward from the heater to the rubbing-surfaces. The supply-piston, marked *b*, is jointed to a rod, *b′*. The working-piston *a* is jointed to a rod, *a′*. Both are connected to cranks on a single shaft mounted directly above. The shaft is marked D, and the cranks E and G. These cranks stand not at right angles, but forming an angle with each other of seventy degrees when the usual amount of clearance obtains—say, one-fifth the capacity of the working-cylinder; but the angle varies to some extent with the increase or decrease of clearance—the greater the clearance the lower the angle—the range being between fifty and seventy-five degrees for clearances between one-third and one-tenth the capacity of working-cylinder. The motion is in the direction of the arrow in Fig. 2, the working-crank being ahead of the other. The valves *m n* in the base of the supply-cylinder B are self-acting. The air is inducted through the valve *m* on the ascent of the supply-piston *b*, and is discharged through the valve *n* during the descent thereof. H is the exhaust-passage, which, it will be understood, is controlled by a valve, *h*, of ordinary construction, represented in dotted lines. This valve is operated by a cam or analogous device through suitable connections.

*Operation.*

When the working-piston *a* has ascended nearly to its highest elevation the exhaust-valve *h* opens, and the piston, on descending again, meets no resistance until it has arrived at a certain point in its downward stroke, when the exhaust-valve closes. In the meantime the supply-piston *b* has completed its upstroke, thereby filling the supply-cylinder B with cold air, and has commenced to descend and force the same through the delivery-valve *n*, and through the passage in the waist-casting C into the bottom of the working-cylinder. This action has an important influence on the success of my machine; for, as the cold air thus driven through the passages requires an appreciable time to raise its temperature, it, by being delivered thus uniformly at a low temperature all around the working-cylinder, drives before it the hot air with which the spaces were previously filled; and, at the moment of the closing of the exhaust-valve *h*, there is an active current of air outward through the exhaust-passage, due to the fact that the descending motion of the supply-piston *b* has progressed one-fifth of its stroke downward, and that the cold air is being driven thereby into and through the working-cylinder. On the closing of the exhaust-valve *h* the continued descent, both of the working-piston *a* and of the supply-piston *b*, compresses the air under both to a nearly equal extent. It follows that there is for a short period no motion of the air through the interior of the waist-piece C, but simply an increase of density and pressure. This condition obtains until the working-piston *a* commences to rise. This motion, being followed up by the about equal descent of the supply-piston, causes a rapid and complete transfer of all the cold and compressed air into the heater without material change of volume. The result is immediate augmentation of pressure, and afterward, as the working-piston moves upward, increase of bulk or volume. Thus the greatest possible result is attained in the amount of power developed. This transfer is accomplished without any considerable change of volume. It is a rapid transference of the cold compressed air in its compressed condition from the compressing-cylinder into and through the heater, and, the upward motion of the main piston being so closely followed up by the down-stroke of the compression-piston, the air is not allowed to increase its bulk till it is nearly all thoroughly heated, and thus the greatest possible power within the limits of temperature and compression is secured. The curtain *x* is merely an extension of the working-cylinder, and its use is to compel a close contact of the inflowing air with the hottest portion of the heater. I attach much importance to the ratio of the entire clearance-space to the amount of air compressed by the working-piston in its descent. This ratio should be so proportioned that the volume of spent hot air arrested in its outflow by the early closure of the exhaust would reach a tension fully equal to that in the supply-cylinder in order that the cold air compressed by the descent of the supply-piston shall remain where compressed until the proper time for its transference into the heater. If the air is allowed to pass into the heater during its compression it takes more power to compress it. I avoid this loss of effect by compressing just sufficient of the previously hot air to keep the cool back until the compression is nearly or quite complete. The regulation is effected by a fly-ball or other ordinary governor (not represented) acting upon a tube, J, placed between cup-leather packings *k k'* in a casing, K, which communicates with the interior of the waist-piece C. When the work requires all the power of the engine the tube J stands low and discharges no air. As the speed increases the tube J is drawn upward, and when much too great it allows a large quantity of air to escape through minute perforations arranged around the lower portion of the tube J. These apertures should be small and the exterior of the tube J at that point made smooth, so that it will run freely past the cup-leather *k*. This regulator-valve, as I will term it, works without appreciable friction, and may be of such size as to control the speed very efficiently under all ordinary conditions. I can effect the same object, to some extent, by a throttle-valve in the passage C, connecting the supply and main cylinders, said valve being, of course, attached to the governor; but I prefer the plan first described. The shaft D may be mounted below and connected by beams or links, the angles of the cranks being preserved; but I prefer the direct connection, as shown. The cards or diagrams on Sheet 2 will be understood with a brief explanation. The uppermost shows two cards superposed one upon the other. The strong line is the pump-card, and shows the power consumed in the action to keep the air supplied properly by the pump. The extremity at and near the right is blank, or the pencil returns on the same line as it goes out, because the exhaust-valve *h* is wide open. The heavy dotted line is the working-cylinder card. The effective power of the engine is the area remaining after the pump-card is deducted from the other. The fine series of dots shows the card of an engine of equal capacity on the ordinary plan, or, more specifically, on the plan which I esteem the best next to this, and which is set forth in the patent issued to me dated October 24, 1871, No. 120,325. The card near the bottom of Sheet 2 is a diagram of the total work of compression done by both pistons, and also shows the greatest possible power which this quantity of air under the assumed conditions of compression and temperature is capable of producing—that is, the whole effect due to heat and pressure. This diagram also shows the portion of this whole effect which this engine utilizes. The interior and rounded portion, marked X, represents the power obtained, and the vacant corners Y and Z represent the loss from the full theoretic effect. The increase of volume due to the temperature is taken at 0.78. The full theoretic pressure which the assumed quantity of air and other conditions given is equal to an average of 8.1 pounds per square inch throughout the stroke, and the mean pressure actually utilized is 7.9 pounds per square inch. The difference, only 0.2 pounds per square inch, is the amount of loss from the full theoretical effect.

Some of the advantages due to certain features of my invention may be separately enumerated, as follows: First, by reason of the fact that the supply-crank or pump-crank G is mounted behind the other, and that the exhaust-valve *h* is held open until the supply-piston *b* has descended about one-fifth of its stroke, I am able to rinse out, so to speak, the entire clearance-cavity, and to fill it with cold air. The gain due to this is experienced in the superior facility with which the air may be afterward compressed to a given density by the further descent of the two pistons. Second, by reason of my waist-piece C, constructed and arranged as represented, I am able to connect the parts strongly and firmly with great facility for removing and exchanging the heaters A', and to distribute the air evenly and efficiently around the base of the working-cylinder, while contributing greatly to arrest the conduction of heat from the heater to the working-cylinder. Third, by reason of the closing of the exhaust-valve *h* before the descent of working-piston *a* is completed, and after the commencement of the descent of the supply-piston has driven out most of the hot air, I am able to compress the air in the base of the working-cylinder to a tension fully equal to that induced in the supply-cylinder, and preferably a little in excess thereof, and to thus hold back the supply of air and prevent its becoming heated while undergoing compression. Fourth, by reason of the tubular perforated valve J, connected to the regulator and working within cup-leathers *k k'*, or equivalent delicate self-adjusting packings, I am able to offer a large area for the discharge of air with a slight motion of the governor, and with little resistance to motion or friction, thus securing great delicacy and efficiency of action. Fifth, by reason of my attaching the two cranks to the shaft at an angle of about seventy degrees from each other, a high degree of compression can be attained, as both pistons are near the bottom of their respective cylinders at the same time. This would be equally true at considerably less than seventy degrees; but in that case the working-piston and supply-piston would be in such relation to each other that there would not be sufficient difference in time to induce an effectual transfer of the air. They would be too nearly on the center at the same time. On the other hand, at ninety degrees, while a very considerable difference of time, or, as it may perhaps be better termed, range of transferring-space, could be secured, the requisite degree of compression could not be got before the main piston moved away. The blowing through of the air contained in, say, one-fifth of the capacity of the pump, and the closing of the exhaust-valve in the proper time to meet the requisite condition of compression, calls for about seventy degrees of the cranks with the usual amount of clearance.

I claim as my invention and desire to secure by Letters Patent—

1. The supply-crank G, arranged behind the working-crank E, in combination with the exhaust-valve *h*, and means for closing it before the working-piston *a* has completed its downward stroke, as herein specified.

2. The waist-piece C, in combination with the parts A, A', and B, all constructed and arranged as represented, for the purposes set forth.

3. In combination with the working and supply cylinders, with their respective pistons and passages and cranks E G, the valve *h*, arranged to close so as to induce a compression in the clearance-space equal to the simultaneous compression in the supply-cylinder.

4. The perforated tubular valve J, constructed and arranged, relatively to the packings *k k'* and casing K, substantially as and for the purposes herein specified.

5. The entire combination and arrangement of the supply-cylinder and piston B *b*, connection-passage C, working cylinder and piston A A' *a*, exhaust-passage H, and valve *h*, with suitable means for operating the latter, by which a portion of the air contained in the compressing or supply cylinder B is blown through the air-passages so as to displace a corresponding quantity of hot air, supplying its place with colder, and consequently denser, air, as herein specified.

In testimony whereof I have hereunto set my hand in the presence of two subscribing witnesses.

ALEXR. K. RIDER.

Witnesses:
WM. C. DEY,
ALFD. WESTBROOK.